(12) United States Patent
Follis

(10) Patent No.: US 11,644,148 B2
(45) Date of Patent: May 9, 2023

(54) DEVICE MOUNTING APPARATUS

(71) Applicant: Grant Follis, Altadena, CA (US)

(72) Inventor: Grant Follis, Altadena, CA (US)

( * ) Notice: Subject to any disclaimer, the term of this patent is extended or adjusted under 35 U.S.C. 154(b) by 0 days.

(21) Appl. No.: 17/241,067

(22) Filed: Apr. 27, 2021

(65) Prior Publication Data

US 2022/0341539 A1 Oct. 27, 2022

(51) Int. Cl.
| | |
|---|---|
| *F16M 13/02* | (2006.01) |
| *F16B 7/04* | (2006.01) |
| *G08B 17/10* | (2006.01) |
| *G03B 17/56* | (2021.01) |
| *F21V 21/02* | (2006.01) |

(52) U.S. Cl.
CPC ........... *F16M 13/022* (2013.01); *F16B 7/042* (2013.01); *F21V 21/02* (2013.01); *G03B 17/561* (2013.01); *G08B 17/10* (2013.01)

(58) Field of Classification Search
CPC ....... F16M 13/022; F16B 7/042; F21V 21/02; G03B 17/561; G08B 17/10
USPC ............ 248/220.22, 544; 340/693.6, 693.11, 340/693.9
See application file for complete search history.

(56) References Cited

U.S. PATENT DOCUMENTS

| | | |
|---|---|---|
| 3,966,056 A | 1/1976 | Larson |
| 4,702,452 A | 10/1987 | Penar |
| 5,149,038 A | 9/1992 | VanCleve |
| 5,577,696 A | 11/1996 | Kramer |
| 5,594,422 A | 1/1997 | Huey, Jr. et al. |
| 6,859,146 B2 | 2/2005 | McGreal et al. |
| 7,233,254 B2 | 1/2007 | Howell |
| 7,858,886 B2 * | 12/2010 | Helms ...................... H02B 1/40 |
| | | 361/733 |
| 9,634,303 B2 | 4/2017 | McBride |
| 10,376,042 B1 * | 8/2019 | Johnson ................. F16M 11/06 |

(Continued)

*Primary Examiner* — Todd M Epps

(57) ABSTRACT

A device mounting apparatus that allows a device such as a smoke detector or carbon dioxide ($CO_2$) detector, as well as other device including an alarm, a camera or a light to be selectively positioning at a location on a surface such as a wall. The apparatus comprises a preferably rectangular, hollow rod with rounded corners, and having a first end, second end, and outer surfaces. A device securing bracket that facilitates the attachment of a device to the rod includes a center section with a rod opening, a first side member and second side member, with each member having an angled section and at least one bore. An apparatus to surface securing bracket allows the apparatus to be attached to a surface such as a wall and has a center section with an outward extending first and second side wall, each side wall having a semi-circular segment, with the rod inserted through the space created when the two segments face each other. The apparatus to surface securing bracket also has a rear section with at least one bore through which a screw or other attachment means is inserted. From exiting the bore, the screw enters into the surface/wall, thereby attaching the apparatus to the surface. To maintain the device attached to the device securing bracket, a device mounting pan is utilized. The pan has a rear panel with at least one bore, a center opening for a power wire and a side wall extending outward from the rear panel's perimeter.

21 Claims, 10 Drawing Sheets

(56) References Cited

U.S. PATENT DOCUMENTS 10,883,656 B1 * 1/2021 Follis .................... F16M 11/18
11,058,022 B1 * 7/2021 Ross .................... G08B 17/117

* cited by examiner

DEVICE MOUNTING APPARATUS

TECHNICAL FIELD

The invention generally pertains to methods of placing a device at a desired location on a surface, and more particularly to a device mounting apparatus for securing a device such as a smoke and/or $CO_2$ detector at a desired location on a surface such as a wall.

BACKGROUND ART

For many locations such as houses, commercial buildings and retail establishments it is desired or required to have one or more devices such as smoke detectors or carbon dioxide ($CO_2$) detectors present.

Typically, a smoke or $CO_2$ detector is secured onto a wall adjacent a ceiling, or onto a ceiling itself. For certain detectors including smoke detectors these locations are acceptable for functionality but for other detectors, as a $CO_2$ detector, an elevated location is not optimal. Also, when placed at an elevated or high location it is often difficult to access a detector, often necessitating the use of a ladder which can be difficult or dangerous.

There is a definite need for a means of securing a smoke detector, $CO_2$ detector car other devices such as an alarm, light, camera or similar device at a selectable location on any flat surface. Allowing a device to be selectively placed, and then facilitating the quick and easy altering of the placement would be extremely beneficial. Means such as an apparatus that allows a single device, or multiple devices to be secured at a desired/optimal location could provide increased effectiveness of the device as well as easier access, thereby leading to a safer environment.

A search of the prior art did not disclose any literature or patents that read directly on the claims of the instant invention. However, the following U.S. patents are considered related:

| PATENT NO. | INVENTOR | ISSUED |
| --- | --- | --- |
| 5,149,038 | VanCleve | Sep. 22, 1992 |
| 6,859,146 | McGreal, et al | Feb. 22, 2005 |
| 10,883,656 | Follis | Jan. 5, 2021 |

The U.S. Pat. No. 5,149,038 patent discloses a mounting assembly for a smoke alarm, which avoids rendering the smoke alarm inoperable. The assembly includes an alarm supporting member having an alarm secured to one end thereof, with the alarm supporting member being fixably and slidably mounted in a wall mount.

The U.S. Pat. No. 6,859,146 patent discloses a mounting kit and smoke detecting apparatus releasably mountable to a support surface, including a smoke detector, and a support pan securable to the support surface and releasably securable to the smoke detector by a separating force. A longitudinal member has a proximate end graspable by a user and a distal end releasably securable to the smoke detector. A first connector on the distal end is releasably securable for mounting the smoke detector to the support pan and a second connector for detaching the smoke detector from the support pan.

The U.S. Pat. No. 10,883,656 patent discloses an apparatus to enable people who are handicapped, especially those who are wheelchair bound, to be able to install and replace objects that are affixed near a ceiling. The apparatus includes a lower level affixed at a location within reach of a seated person and a vertical height adjustment pole movably retained at the lower level. A top pan retains a device which is positioned adjacent a ceiling. The top pan is affixed adjacent a top end of the vertical height adjustment pole which is lowered to enable the seated person to work on the device. After work on the device is completed, the vertical height adjustment pole is retained so that the top pan is adjacent a ceiling.

For background purposes and indicative of the art to which the invention relates, reference may be made to the following remaining patents found in the patent search.

| PATENT NO. | INVENTOR | ISSUED |
| --- | --- | --- |
| 3,966,056 | Larson | Jun. 29, 1976 |
| 4,702,452 | Penar | Oct. 27, 1987 |
| 5,577,696 | Kramer | Nov. 26, 1996 |
| 5,594,422 | Huey, Jr. et al | Jan. 14, 1997 |
| 7,233,254 | Howell | Jun. 19, 2007 |
| 7,858,886 | Helms, et al | Dec. 28, 2010 |
| 9,634,303 | McBride | Apr. 25, 2017 |

DISCLOSURE OF THE INVENTION

A device mourning apparatus (DMA) that is designed to secure a device such as a smoke detector, carbon dioxide ($CO_2$) detector or other similar device at a selected location on a flat surface such as a wall. The DMA comprises a rod that is preferably rectangular with indented rounded corners, and having a first end, a second end and an outer surface. A device securing bracket allows a device to be secured onto the rod and includes a center section having a rod opening, a first side member having an angled section and at least one bore, and a second side member also having an angled section and at least one bore. In order to secure the DMA onto a flat surface, an apparatus to surface securing bracket is utilized. The bracket has a center section with an integral first side wall having a semi-circular segment and at least one threaded bore on one side and a non-threaded bore on the opposite side, an integral second side wall also having a semi-circular segment and at least one threaded bore on one side and a non-threaded bore on an opposite side, a pressure opening, and a clamping screw that is tightened into the bores on the first and second side walls. The tightening pressure from the clamping screw causes the center section to compress and clamp onto the rod that is inserted through the space created by the two semi-circular segments. The apparatus to surface securing bracket also has a rear section with at least one bore through which screws, nails or bolts are initially inserted and then into the surface, thereby securing the bracket and the attached rod onto the surface. A device mounting apparatus facilitates the securement of a device onto the DMA and includes a rear panel with multiple bores, a center opening for a device power wire, and a side wall that extends outward from the perimeter of the rear panel and has at least one device attachment tab. The multiple bores on the rear panel are placed at locations to allow a variety of different devices to be secured onto the mounting pan.

The first end or second end of the rod is inserted into and friction held within the rod opening on the device securing bracket's center section, and the device securing bracket is selectively positioned at any location along the length of the rod. This allows a device to be secured at a high location adjacent a ceiling or a low location near a floor, or any place in-between.

The device securing bracket also has either a notch or a full-length channel that allows a device power wire to be directed from the device, through the bracket and into the hollow rod, from where the wire is connected to a power source.

In view of the above disclosure, the primary object of the invention is to provide a device mounting apparatus that allows a device such as a smoke detector and/or $CO_2$ detector to be secured at a desired location on a flat surface such as a wall.

In addition to the primary object, it is also an object of the invention to provide a device mounting apparatus that:
is easy to install,
can be used to secure a variety of devices,
increases the safety of a location where the DMA is used,
can be made of various materials and painted to match or accentuate an existing wall color,
can be permanently or removably attached onto a surface,
does not require maintenance once attached,
can be included as an original component when constructing a house, building or other structure,
can be broken-down to a small size for transportation, shipping and sales display,
can be an incentive to install a greater number of smoke and/or $CO_2$ detectors,
is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
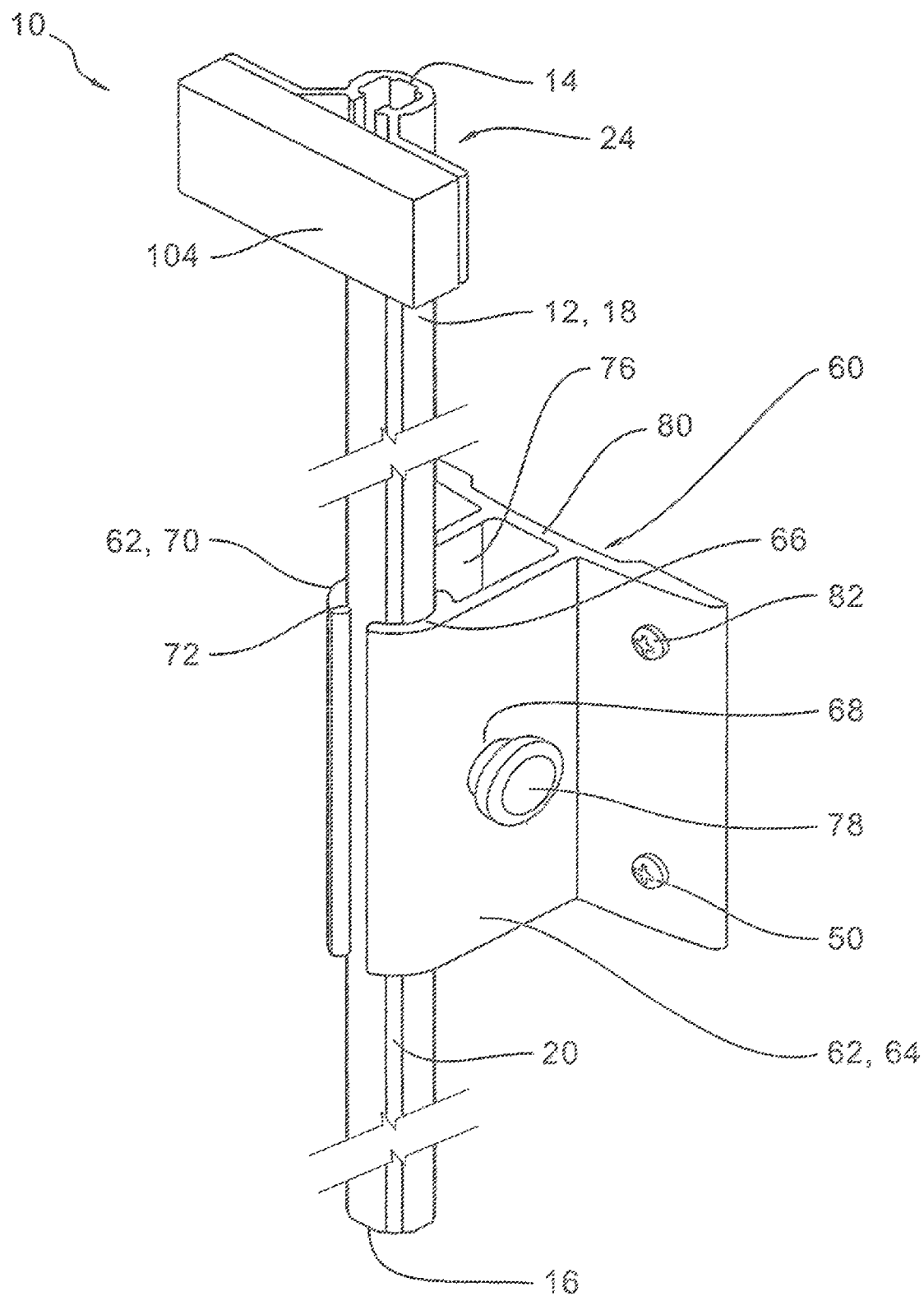
FIG. 1 is an orthographic view showing a device mounting apparatus (DMA) including a rod, an apparatus to surface securing bracket and a single device.
Figure 2:
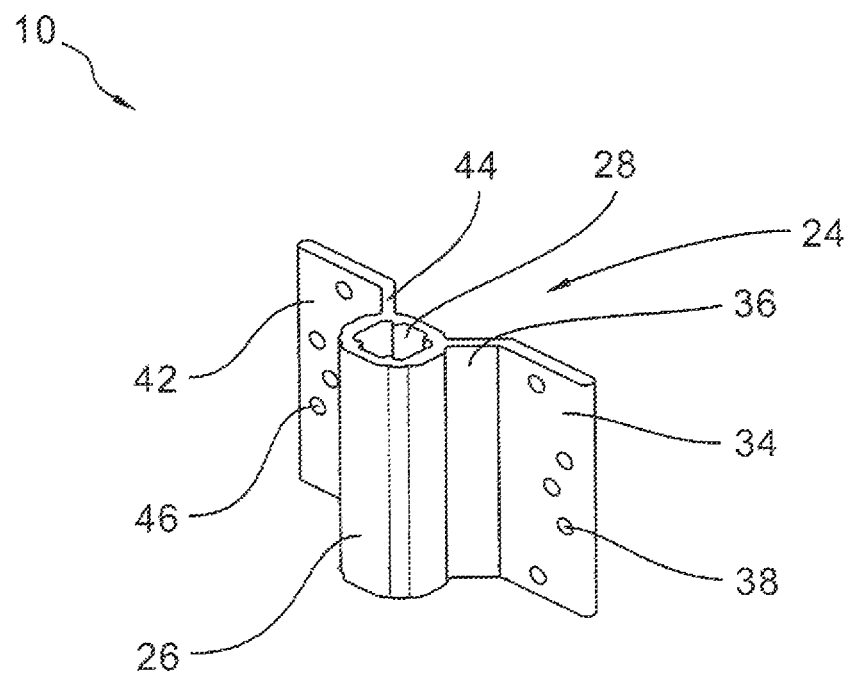
FIG. 2 is an orthographic rear view showing the DMA's device securing bracket.
Figure 3:
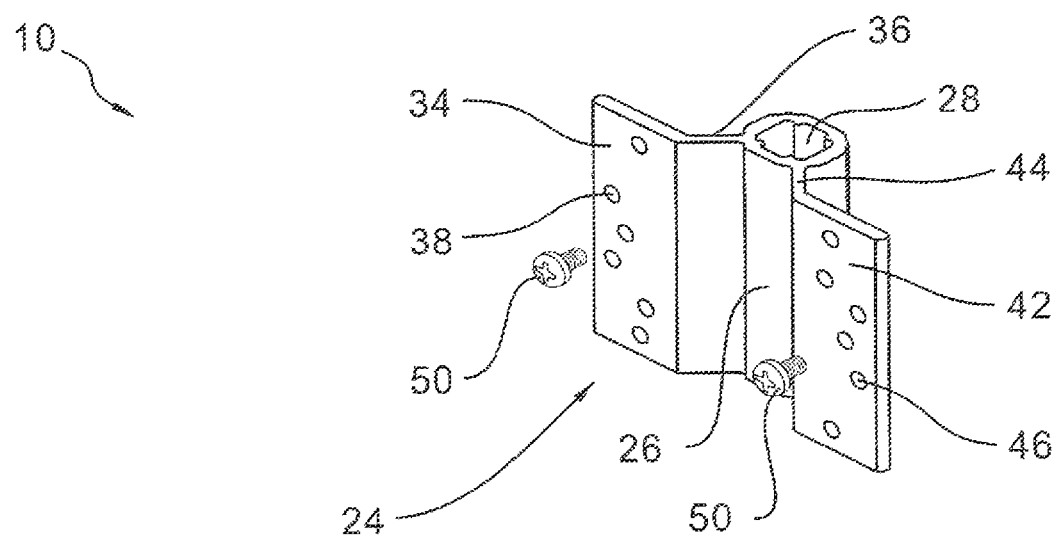
FIG. 3 is an orthographic front view showing the DMAs device securing bracket.

The best mode for carrying out the invention is presented in terms that disclose a preferred embodiment of a device mounting apparatus (DMA). It is often desirable or required to place a device such as a smoke detector and/or a carbon dioxide ($CO_2$) detector within a structure. Any place where people reside or congregate will benefit from, or be required to have, these devices, and it is common to see a dedicated detector in each room. Typically, a detector is attached to a wall near the ceiling, or attached to the ceiling itself.

This can be a problem because many detectors use a battery as a primary, or a back-up, power source. When the battery must be replaced, access to the battery compartment within the detector often requires the use of a stool or ladder to reach the detector at its elevated location. This problem is also experienced when a detector must be re-set after sounding, which typically requires pushing a button. Also, while smoke detectors do function well when placed at an elevated location, $CO_2$ detectors are much more effective when placed at a lower location, closer to the ground.

The DMA offers a solution to this problem by providing a means by which a device can be attached to a surface such as a wall and be selectively positioned at an optimal location. The DMA along with a device, or multiple devices, can be quickly and easily assembled, and attached to a surface. Also, depending on the requirement, the DMA can be either permanently attached or removably attached.

The DMA 10, as show in FIGS. 1-16, is comprised of the following major elements: a rod 12, a device securing bracket 24, an apparatus to surface securing bracket 60, and a device mounting pan 86. As previously disclosed, the DMA 10 functions for, and in combination with, a device 104 such as a smoke detector 106, a $CO_2$ detector 108, a combination smoke and $CO_2$ detector, an alarm, a light or a camera. It should be noted that those are just examples, and the DMA can be configured to function with almost any device that is attached to a surface such as a wall.

The rod 12, as shown in FIGS. 1, 4, 5, 10, 11, 14-16, comprises a first end 14, a second end 16, and an outer surface 18. The rod is preferably hollow and has a rectangular shape with indented rounded corners 20. The rod 12 can be any length, with a range of 12-inches to 54-inches preferred.

Figure 4:
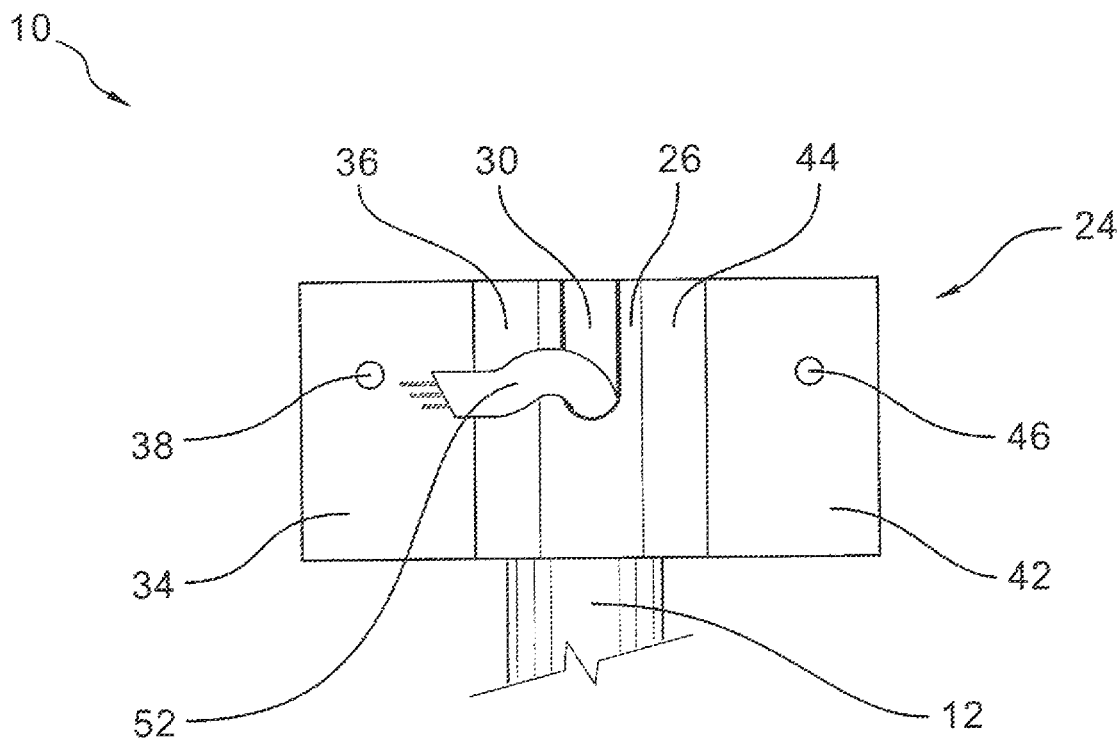
FIG. 4 is an elevational view showing the device securing bracket with a notch for a power wire.
Figure 5:
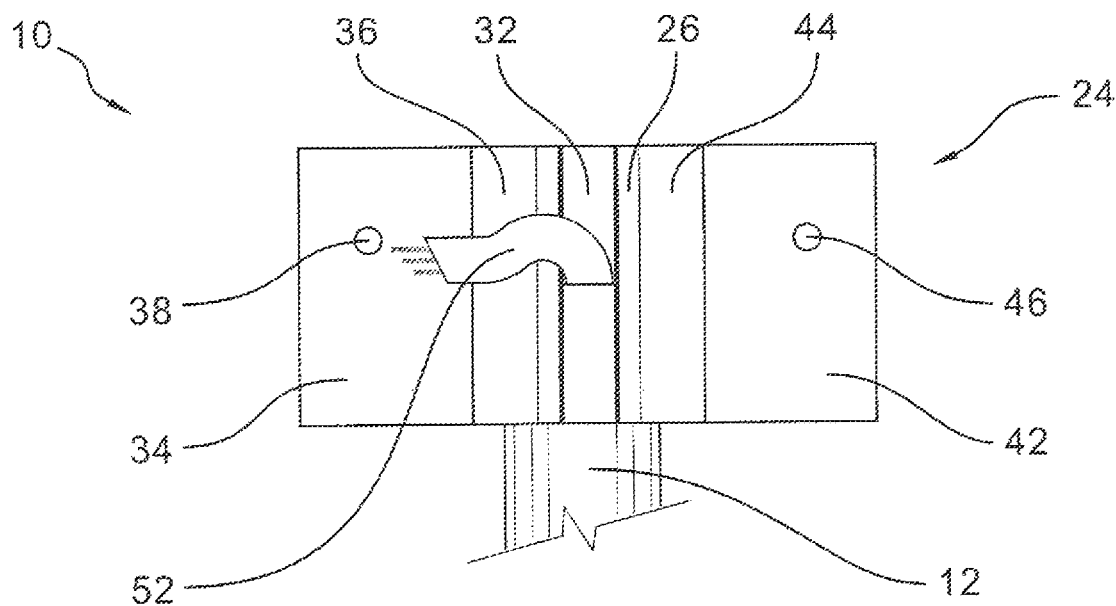
FIG. 5 is an elevational view showing the device securing bracket with a full-length channel for a power wire.

The device securing bracket 24, as shown in FIGS. 1-5 and 12-14, is utilized to attach a device 104 onto the rod, and includes a center section 26 with a rod opening 28. On the opening 28 is either a notch 30 extending downward, as shown in FIG. 4, or a full-length channel 32, as shown in FIG. 5. The notch 30 and the channel 32 allow a power wire 52 (or data wire) coming from the device 104 to be inserted into and maintained within the rod 12. The device securing bracket 24 also has a first side member 34 with an angled section 36 having a bore, and a second side member 42 with an angled section 44 having a bore 46. Both the first side member 34 and second side member 42 are integrally attached to the center section 26, forming a single unitary component, as shown in FIGS. 2-5 and 12-14. In order to maintain the device 104 attached to the device securing bracket 24, a screw 50 is inserted through each bore 38,46.

The apparatus to surface securing bracket 60, as shown in FIGS. 1, 6-11 and 14 is comprised of a center section 62, first side wall 64 integral with and extending from the center section and having a semi-circular segment 66 and a threaded bore 68, a second side wall 70 integral with and extending from the center section and having a semi-circular segment 72 and a threaded bore 74, a pressure opening 76 and a rear section 80 with at least one bore 82. When assembled, the apparatus to surface securing bracket 60 has the rod 12 inserted through the space created when the two semi-circular segments 66,72 are facing each other. A clamping screw 78, as shown in FIGS. 1, 9-11 and 14, is tightened through each of the threaded bores, thereby producing a clamping action from the semi-circular segments onto the rod, the pressure from which maintains the rod 12 in position.

Figure 6:
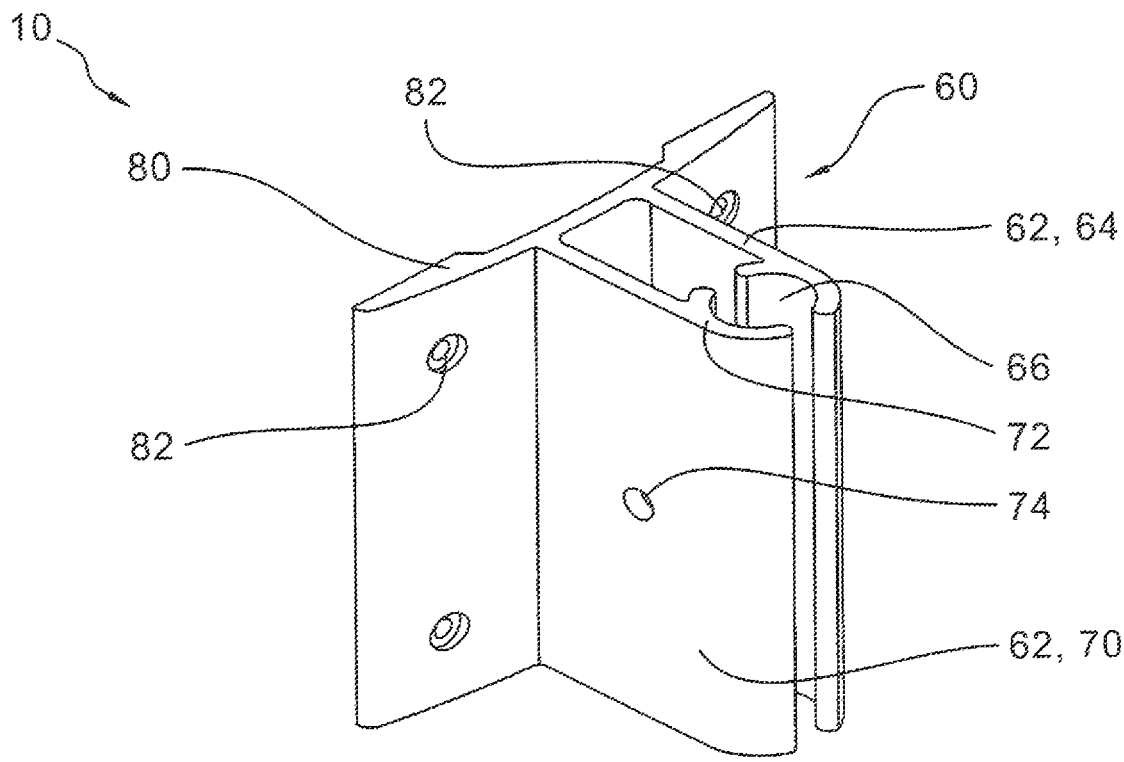
FIG. 6 is an orthographic front left-side view showing the DMA's apparatus to surface securing bracket with attaching screws on the outer sides of the center section.
Figure 7:
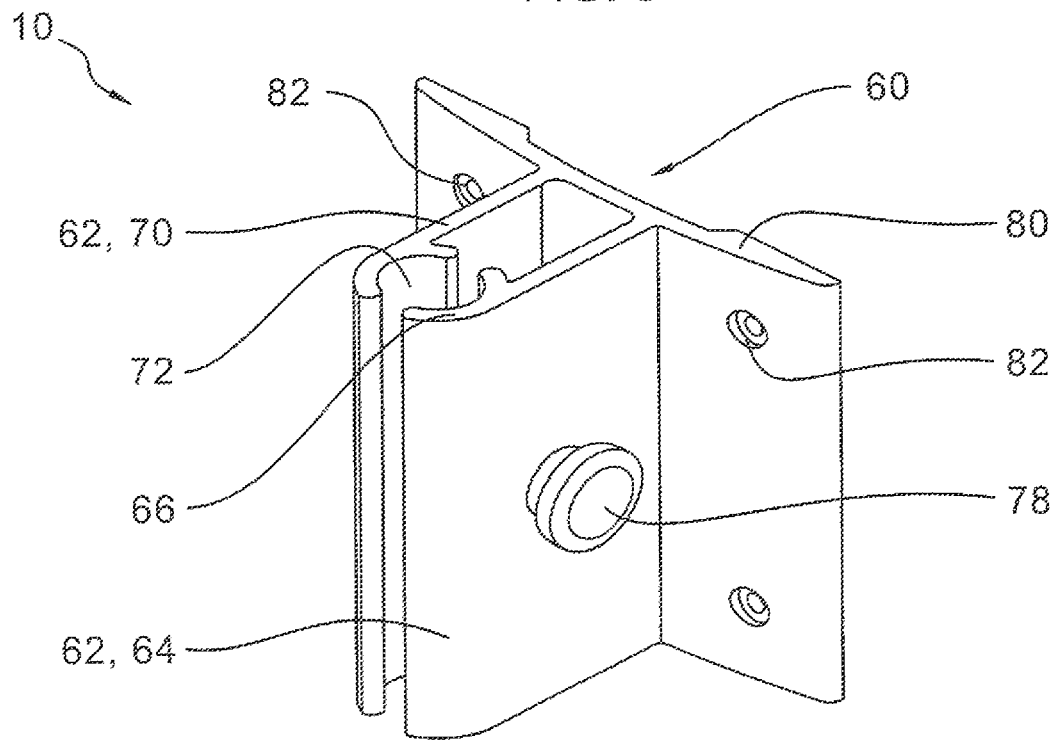
FIG. 7 is an orthographic front right-side view showing the DMA's apparatus to surface securing bracket with attaching screws on the outer sides of the center section.
Figure 8:
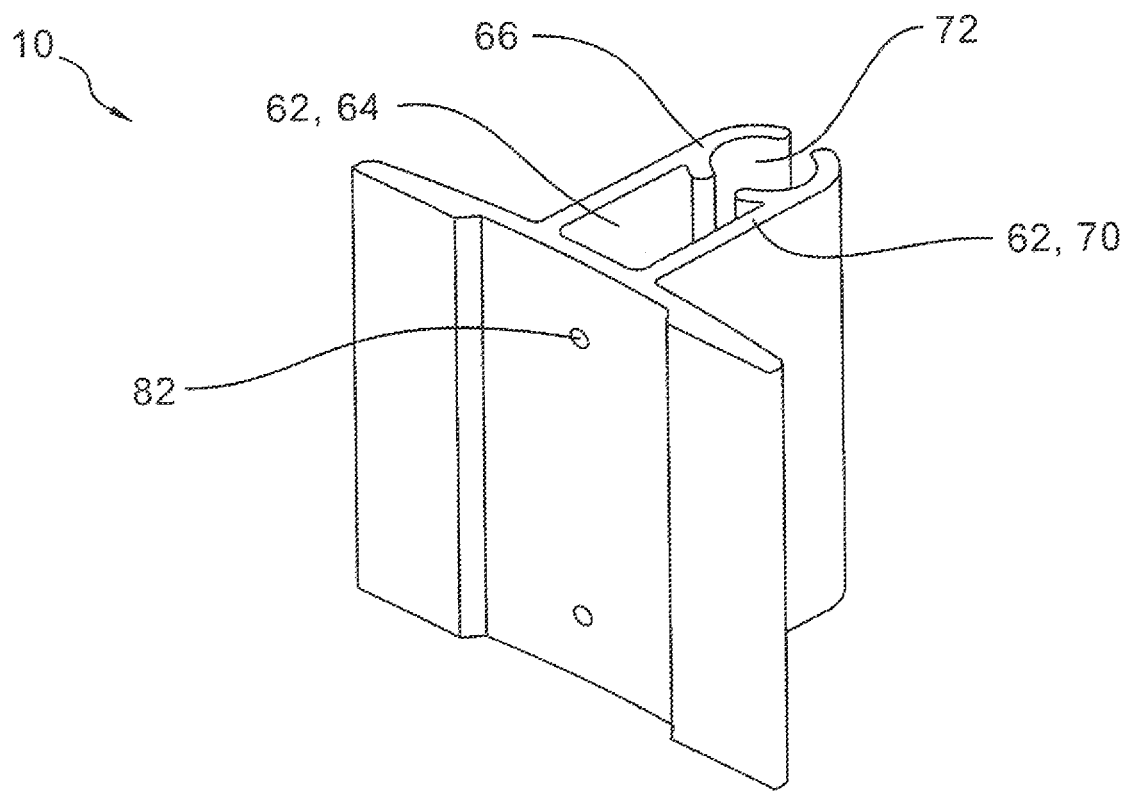
FIG. 8 is an orthographic rear view showing the DMA's apparatus to surface securing bracket with at least one attaching screw at the substantial middle of the center section.
Figure 9:
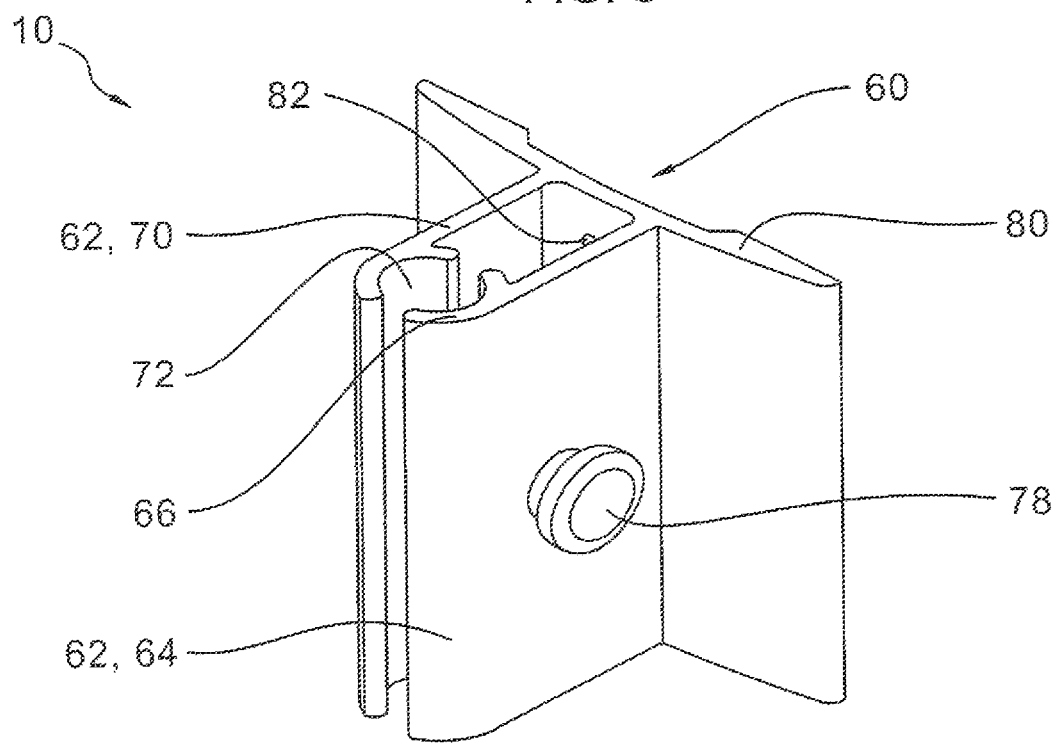
FIG. 9 is an orthographic front right-side view showing the DMA's apparatus to surface securing bracket with at least one attaching screw at the substantial middle of the center section.
Figure 10:
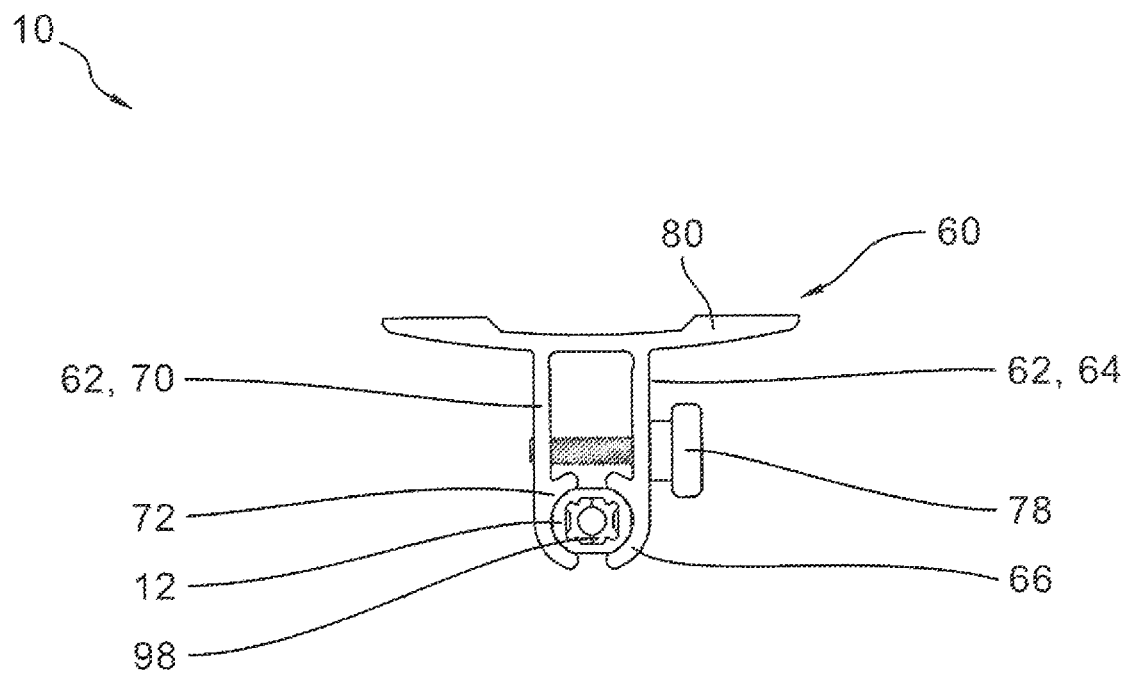
FIG. 10 is a top plan view showing the DMA's apparatus to surface securing bracket with a rod being held between two semi-circular segments.
Figure 11:
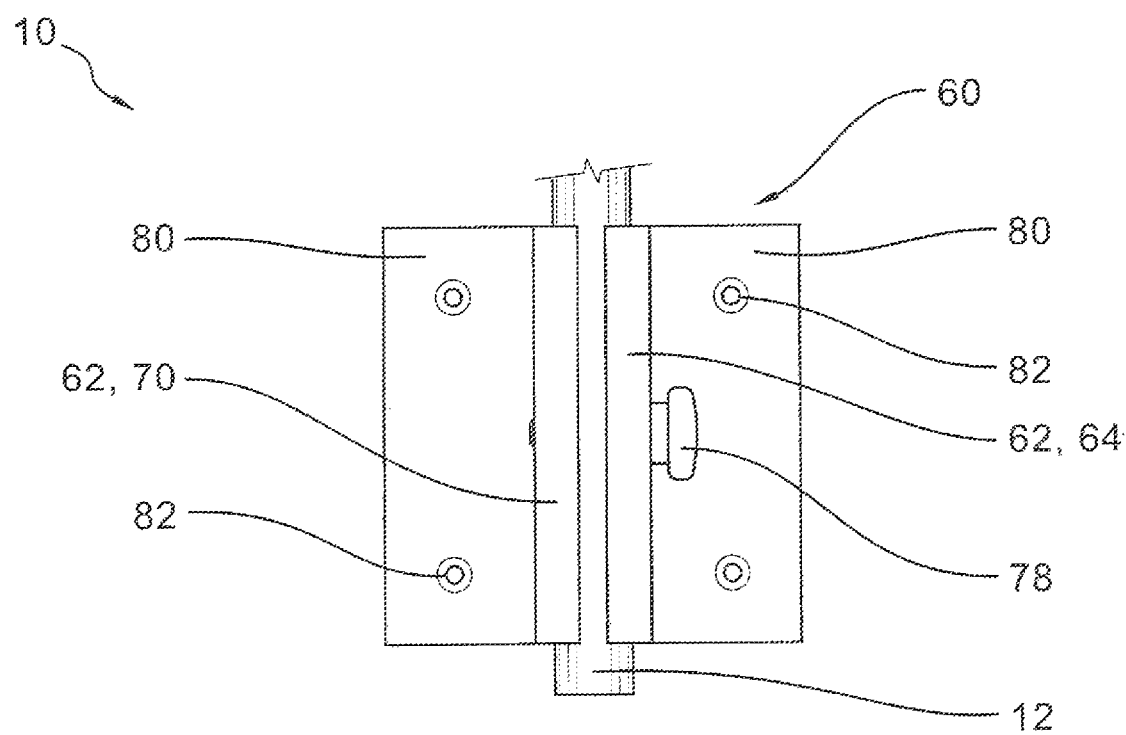
FIG. 11 is an elevational front view showing the DMA's apparatus to surface securing bracket with the bracket attached to a rod.
Figure 12:
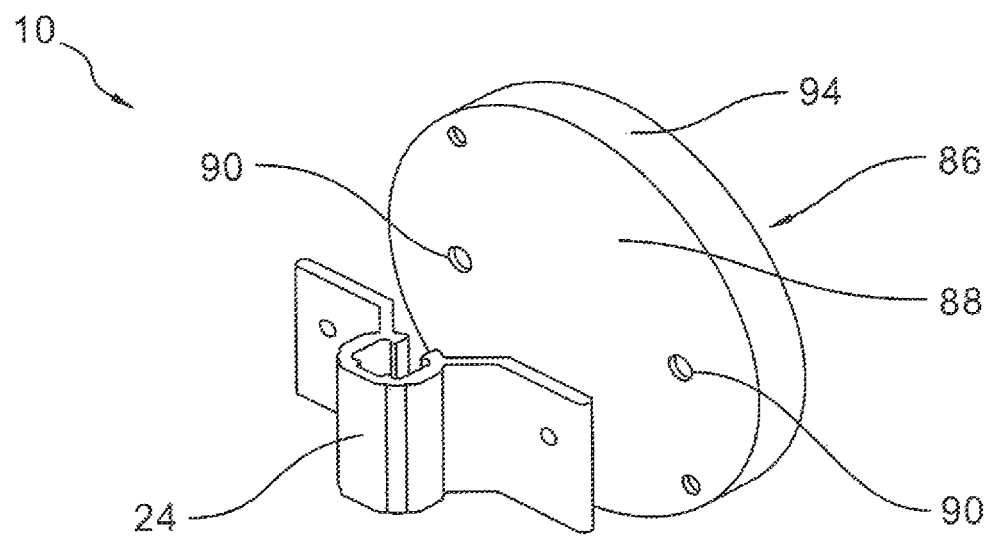
FIG. 12 is an orthographic rear view showing the DMA's device securing bracket prior to attachment to a device mounting pan.

A screw, or other attachment means such as a bolt, a nail or an adhesive, is then inserted through each of the at least one bores 82 and into the surface, which maintains the apparatus to surface securing bracket 60 along with the attached rod 12, on the surface. As shown in FIGS. 6 and 7, at least one bore 82 can be located on the outer sides of the center section 62, or, as shown in FIGS. 8 and 9, at least one bore 82 can be located at the substantial middle of the center section 62.

Figure 13:
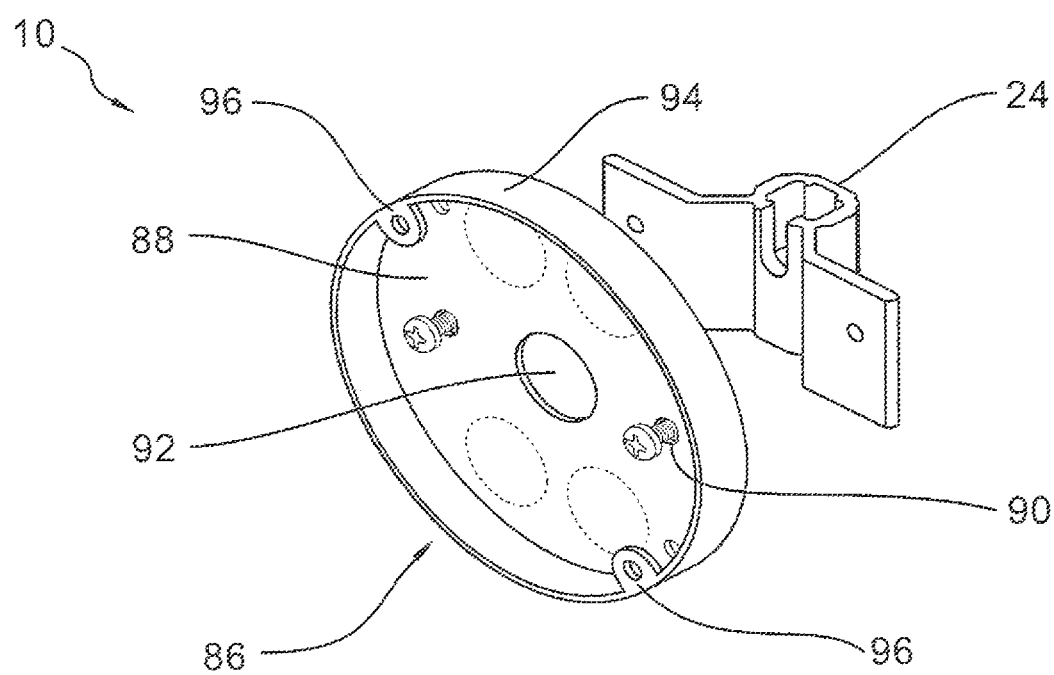
FIG. 13 is an orthographic front view showing the DMA's device securing bracket prior to attachment to a device mounting pan.
Figure 14:
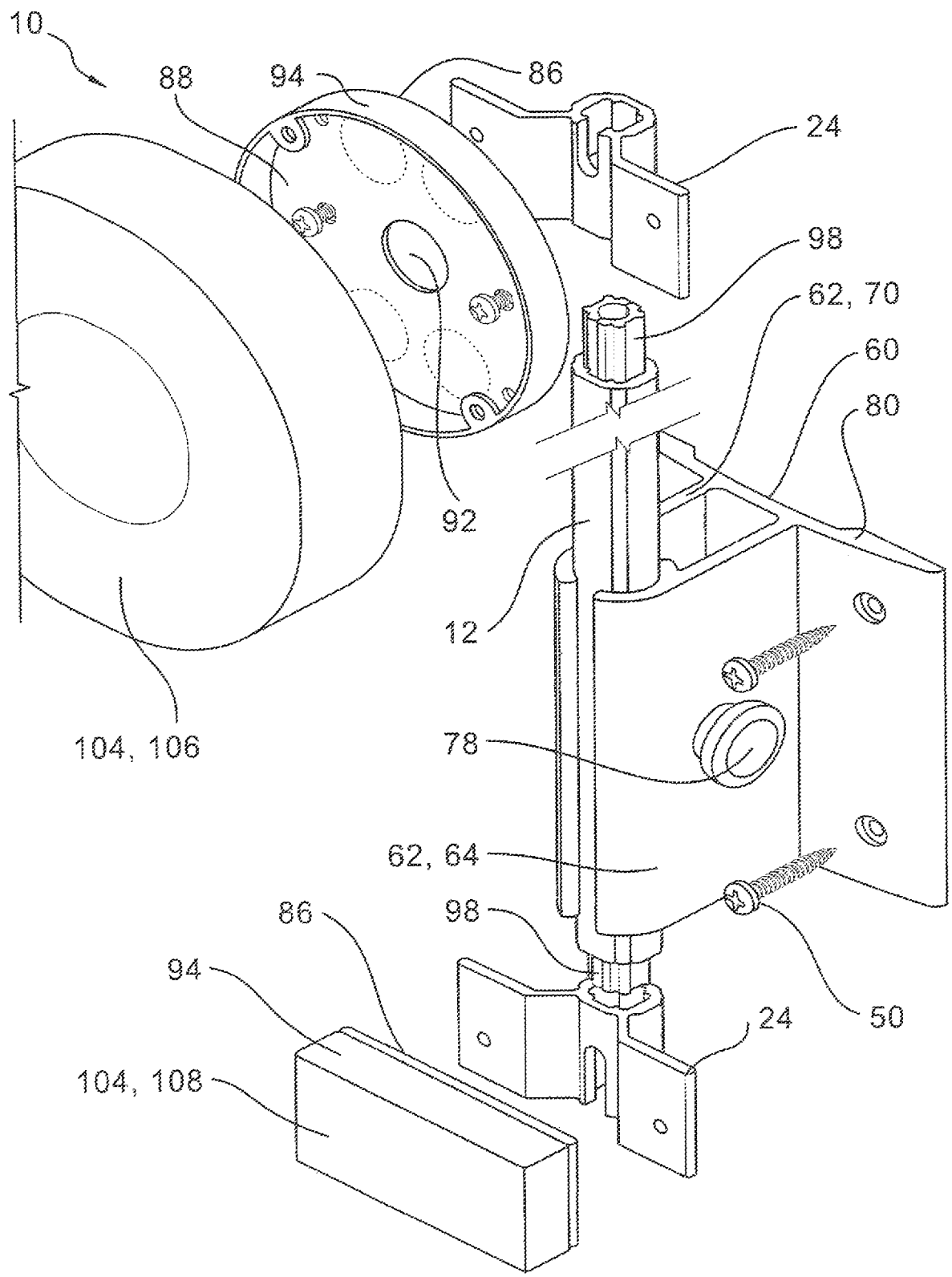
FIG. 14 is an orthographic front view showing the DMA with both a smoke detector and a carbon dioxide ($CO_2$) detector attached to the DMA.

In order to facilitate the attachment of a device 104, onto the DMA 10, the device mounting pan 86 is utilized. As shown in FIGS. 1, 12-14, the device mounting pan 86 interfaces with the device securing bracket 24 and includes a rear panel 86 with at least one, and preferably multiple bores 90, a center opening 92 to allow a power wire 52 or data wire to pass through, and a side wall 94 that extends outward/forward from the perimeter of the rear panel 88. As shown in FIG. 13, at least one device attachment tab 96 can extend from the outer edge of the side wall 94 at a 90° inward angle.

Figure 15:
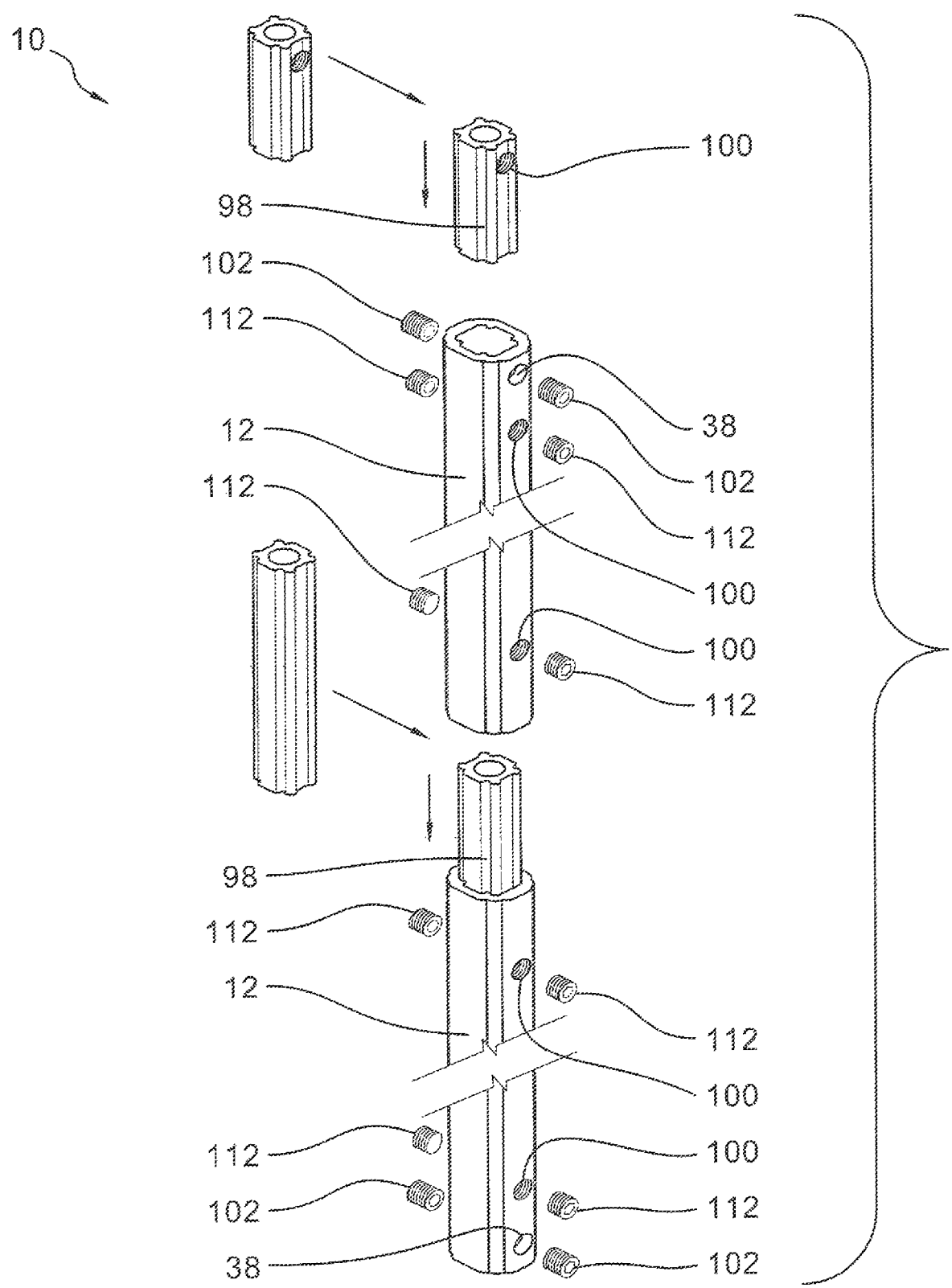
FIG. 15 is an orthographic view showing two sections of rod with a single-piece rod connecting insert used to attach the two rod sections together.

To provide easier transportation/shipping and storage of the DMA 10, the rod 12 can be cut into multiple pieces ranging from 12 inches to 54 inches. A rod connecting insert 98 is then placed within the rod 12, with substantially one-half of the insert 98 within two sequential rod pieces, as shown in FIG. 15. There is at least one threaded bore 100 on the outer surface at each end of the rod 12, positioned where the insert 98 is located within the two pieces of the rod. An insert screw 102 is tightened through each bore 100 such that the screw 102 impinges on the rod 12, thereby holding the two pieces of sequential rod together. In an alternate design, the rod connecting insert 98 can be made in two pieces and held in place by at least one screw inserted into each piece, as shown in FIG. 16.

The rod 12, device securing bracket 24, apparatus to surface securing bracket 60 and device mounting pan 86 can made of various materials including plastic, metal, wood or a composite. For many applications, only a single apparatus to surface securing bracket 60 is required, although multiple brackets 60 can be utilized if desired or required. Also, multiple devices can be attached to a single DMA 10. For example, a smoke detector can be placed at the top of a vertically-oriented DMA, with a $CO_2$ detector placed at the bottom near the ground, where the $CO_2$ detector is more effective, or the DMA 10 can have a smoke detector and $CO_2$ detector, along with a light or a camera placed between the two detectors. Additionally, components of a detector such as electronics and/or a battery can be separated from the detector sensor and placed at a convenient location remote from the detector sensor. Many sensors alone are relatively small compared to a conventional detector with an all-in-one enclosure design. The small sensors (for example, 1 inch diameter) can be easily placed at many various locations which can hide or otherwise make the sensors unobtrusive. When this is done the detector alarm (or multiple alarms) can also be placed at an optimal location. If desired multiple sensors running off a single electronics array and single battery can be easily placed in one room, or other space, thereby providing increased smoke or CO2 detection efficacy The hollow design of the rod 12 allows a power wire 52 or data wire to travel from a device, through the rod and on to either a mains power supply or a battery. Placing the power wire 52 or data wire through the rod 12, removes the need for the wire to either hang down adjacent the DMA 10, or be placed within/behind the surface such as a wall (which requires at least two holes to be made in the wall for the wire to enter and exit). A pre-made cable, such as a USB data cable, will often not fit through a typical opening but a pre-made cable will fit within the rod 12.

Figure 16:
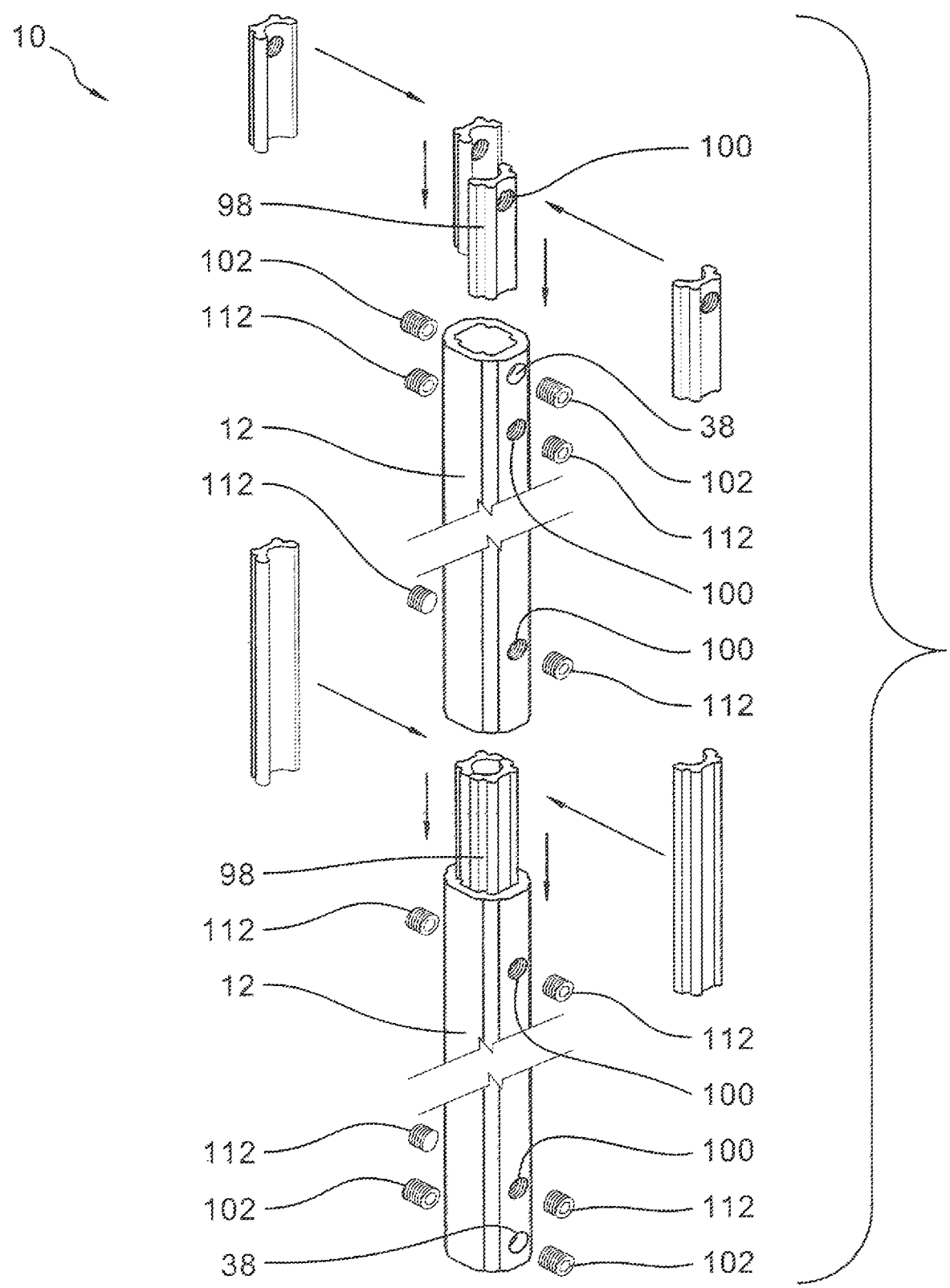
FIG. 16 is an orthographic view showing two sections of rod with a two-piece rod connecting insert used to attach the two rod sections together, as well as at least one wire retraining screw to maintain a wire's position within the rod.

Also, to hold a power wire 52 or data wire in place within the rod, at least one wire restraining screw 112, as shown in FIGS. 15 and 16, can be inserted through a bore and apply pressure onto the wire, thereby maintaining the wire's position.

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

The invention claimed is:
1. A device mounting apparatus comprising:
a rod comprising a first end, a second end and an outer surface,
a device securing bracket comprising a center section having a rod opening, a first side member having an angled section and at least one bore, and a second side member having an angled section and at least one bore,
an apparatus to surface securing bracket comprising a center section configured with a first side wall having a semi-circular segment and at least one threaded bore, and
a second side wall having a semi-circular segment and at least one threaded bore; a pressure opening; and a rear section having, at least one bore, and
a device mounting pan comprising a rear panel having at least one bore, a center opening and a side wall extending outward from a perimeter of the rear panel and having at least one device attachment tab.
2. The device mounting apparatus of claim 1, wherein a device is selected from a group consisting of a smoke detector, a carbon dioxide $CO_2$ detector, a combination smoke and $CO_2$ detector, an alarm, a light and a camera.

3. The device mounting apparatus of claim 1, wherein the rod, the device securing bracket and apparatus to wall securing bracket are made of a material selected from a group consisting of plastic, metal, wood and a composite.

4. The device mounting apparatus of claim 1, wherein the first end or the second end of the rod is inserted into and friction held within the rod opening on the center section of the device securing bracket.

5. The device mounting apparatus of claim 1, wherein the device securing bracket is configured to be selectively positioned at any location along a length of the rod.

6. The device mounting apparatus of claim 1, wherein the rod is hollow and rectangular shaped with rounded indented corners, and the device securing bracket's rod opening is correspondingly dimensioned.

7. The device mounting apparatus of claim 1, wherein the device mounting pan is configured for attachment by a screw inserted through the at least one bore and into the at least one threaded bore on the first side member and second side member, wherein the device is then attached by attachment means to the device mounting pan.

8. The device mounting apparatus of claim 7, wherein the attachment means are selected from a group consisting of at least one screw, at least one bolt and nut, an adhesive, a clip, and a slot and tab.

9. The device mounting apparatus of claim 1, wherein the device securing bracket's center section further comprises a notch that allows a power wire to be inserted into the rod from the device securing bracket.

10. The device mounting apparatus of claim 1, wherein the device securing bracket's center section further comprises a channel that extends the full length of the center section and allows a power wire to be inserted into the rod from the device securing bracket.

11. The device mounting apparatus of claim 1, wherein the rod further comprising a rod connecting insert that is configured to be placed within the rod to allow at least two sections of rod to be secured together, wherein an insert screw is tightened until contacting and applying pressure onto the insert within the rod.

12. A device mounting apparatus comprising:
a hollow rectangular rod with indented rounded corners comprising:
a first end,
a second end,
an outer surface,
a device securing bracket comprising:
a center section having a rod opening,
a first side member having an angled section and at least one bore,
a second side member having an angled section and at least one bore,
an apparatus to surface securing bracket comprising:
a center section comprising:
an integral first side wall having a semi-circular segment and at least one threaded bore,
an integral second side wall having a semi-circular segment and at least one threaded bore,
a pressure opening, and
a clamping screw that is tightened into the bores on the first and second side walls, wherein the tightening pressure causes the center section to compress and clamp onto the rod that is inserted through a space created when the two semi-circular segments are configured facing each other, and
an integral rear section having at least one bore,
a device mounting pan comprising:
a rear panel having;
bores,
a center opening, and
a side wall extending outward from a perimeter of the rear panel and having at least one device attachment tab.

13. The device mounting apparatus of claim 12, wherein the device is selected from a group consisting of a smoke detector, a carbon dioxide $CO_2$ detector, a combination smoke and $CO_2$ detector, an alarm, a light and a camera.

14. The device mounting apparatus of claim 12, wherein the rod, the device securing bracket and apparatus to wall securing bracket are made of a material selected from a group consisting of plastic, metal, wood and a composite.

15. The device mounting apparatus of claim 12, wherein the first end or second end of the rod is inserted into and friction held within the rod opening on the center section of the device securing bracket.

16. The device mounting apparatus of claim 12, wherein the device securing bracket is configured to be selectively positioned at any location along the length of the rod.

17. The device mounting apparatus of claim 12, wherein the device mounting pan is configured for attachment by a screw inserted through the at least one bore and into the at least one threaded bore on the first side member and second side member, wherein a device is then attached by attachment means to the device mounting pan.

18. The device mounting apparatus of claim 17, wherein the attachment means are selected from a group consisting of at least one screw, at least one bolt and nut, an adhesive, at least one nail, a clip, and a slot and tab.

19. The device mounting apparatus of claim 12, wherein the device securing bracket's center section further comprises a notch that allows a power wire to be inserted into the rod from the device securing bracket.

20. The device mounting apparatus of claim 12, wherein the device securing bracket's center section further comprises a channel that extends the full length of the center section and allows a power wire to be inserted into the rod from the device securing bracket.

21. The device mounting apparatus of claim 12, further comprising a rod connecting insert that is configured to be placed within sections of the rod to allow at least two sections of the rod to be secured together, wherein an insert screw is tightened until contacting and applying pressure onto the insert within the rod.

* * * * *